Oct. 13, 1931.    G. WEIDEHOFF    1,827,682
ELASTIC FLUID TURBINE
Filed June 17, 1929

Inventor:
Georg Weidehoff,
by Charles E. Mullan
His Attorney.

Patented Oct. 13, 1931

1,827,682

UNITED STATES PATENT OFFICE

GEORG WEIDEHOFF, OF CHARLOTTENBURG, GERMANY, ASSIGNOR TO GENERAL ELECTRIC COMPANY, A CORPORATION OF NEW YORK

ELASTIC FLUID TURBINE

Application filed June 17, 1929, Serial No. 371,694, and in Germany July 12, 1928.

The present invention relates to elastic fluid turbines and especially to elastic fluid turbines comprising a single-flow element and a double-flow element mounted on a common shaft.

In a turbine installation composed of a single-flow turbine element and a double-flow turbine element, an axial thrust is produced on the shaft owing to the push exerted by the single-flow turbine element, even if the double-flow turbine element is fully balanced. This axial thrust is produced irrespective of whether the single-flow element is provided with impulse or reaction blades. In impulse turbines this thrust occurs usually owing to small steps on the shaft between the internal stuffing boxes of the individual stages, and also occurs when said stuffing boxes are of uniform diameter.

According to the present invention this axial thrust is balanced by totally or partially providing the portion of the double-flow rotor facing the single-flow element, according to necessity, with reaction blades; or by subjecting one rotor portion of the double-flow element to additional steam pressure. When both portions of the double-flow turbine element are provided with reaction blades, the portion of the double-flow rotor which is opposite the single-flow element may be given a more intensive reaction than the remaining portion of the said rotor; or it may likewise be subjected to additional steam pressure which counteracts the axial thrust.

Figure 1:
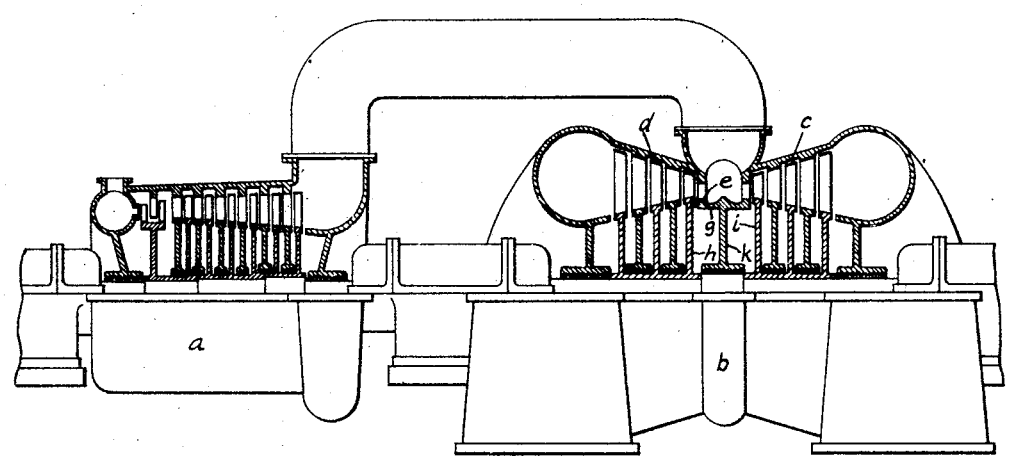

Figure 1 of the drawings is a longitudinal section through a turbine installation, the single-flow and double-flow elements of which are disposed on a common shaft.

Figure 2:
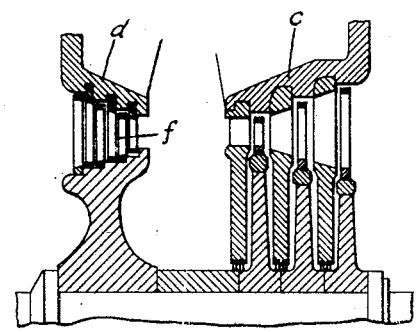

Figure 2 is a partial view of the double-flow rotor of a low-pressure turbine.

Referring to Figure 1, a single-flow impulse high-pressure turbine element $a$ is mounted on a common shaft with a double-flow low-pressure turbine element $b$ likewise provided with impulse blades. The two portions $c$ and $d$ of the last mentioned turbine element are balanced one relatively to the other. There is, however, a certain amount of pressure which acts in a direction toward the right in Figure 1 due to the axial thrust of the turbine element $a$, and to balance this, there is provided an opposing pressure which is exerted on the first disc wheel $h$ of the portion of the double-flow element opposed to the single-flow turbine element. This pressure is produced by providing a suitable packing $e$ between the first nozzle ring and the first rotor wheel and an aperture $g$ opening into the space between the first rotor wheel and the adjacent partition wall $k$ whereby elastic fluid of the same pressure as that supplied to the first stage nozzle is supplied to such space. An equal amount of pressure cannot take effect before the first wheel $i$ of the double-flow portion $c$ because the steam in this portion must flow through the first row of nozzles before reaching the space in front of the disc wheel $i$.

Instead of exerting steam pressure on a turbine disc-wheel, the axial thrust may be balanced, as shown in Figure 2, by fitting reaction blades $f$ to the double-flow portion $d$ facing the high-pressure element $a$, the other low pressure portion $c$ being provided with impulse blades. The extent of the reaction to be given blades $f$ is governed by the amount of axial thrust exerted by the high-pressure element $a$.

What I claim as new and desire to secure by Letters Patent of the United States, is:

1. A turbine installation comprising a high pressure single-flow element and a low-pressure double-flow element, said elements having separate casings and being mounted on a common shaft, said double flow element having its two sections arranged with their high pressure ends adjacent to each other, and with a common elastic fluid supply chamber, and means for subjecting one of said two low-pressure sections to an axial pressure greater than that to which the other section is subjected for balancing the axial thrust of the single-flow element.

2. The combination with a turbine installation comprising a single-flow element and a double-flow element mounted on a common shaft, said double-flow element having a common space from which elastic fluid is supplied to both portions in opposite directions so as to counterbalance the axial thrust of these portions, of means for supplying elastic fluid from said space to the first disc wheel of one of said portions to produce on it a pressure of a value such as to balance the axial thrust of the single-flow element.

3. The combination with a turbine installation comprising a single-flow element and a double-flow element mounted on a common shaft, said double-flow element having a wall which separates one portion from the other and a common space from which elastic fluid is supplied to both portions in opposite directions so as to counterbalance the axial thrust of these portions, of means providing a conduit for supplying elastic fluid from said space to the space between said wall and the first disc wheel of one of said portions for producing on such portion an axial thrust such as to balance the axial thrust of the single-flow element.

In witness whereof, I have hereunto set my hand this 28th day of May, 1929.

GEORG WEIDEHOFF.